United States Patent [19]
Sone et al.

[11] Patent Number: 5,542,832
[45] Date of Patent: Aug. 6, 1996

[54] ROTARY FLUID COMPRESSOR HAVING AN OLDHAM MECHANISM

[75] Inventors: Yoshinori Sone, Yokohama; Takayoshi Fujiwara, Tokyo; Takashi Honjo, Kawasaki; Takuya Hirayama, Fujisawa; Hiroyasu Yoshizawa, Oomiya, all of Japan

[73] Assignee: Kabushiki Kaisha Toshiba, Japan

[21] Appl. No.: 305,944

[22] Filed: Sep. 15, 1994

[30]     Foreign Application Priority Data

Mar. 31, 1994  [JP]  Japan .................................... 6-063762

[51] Int. Cl.⁶ .......................... F04C 18/00; F04C 29/00; F16D 3/04
[52] U.S. Cl. .......................... 418/152; 418/220; 464/104
[58] Field of Search ..................................... 418/152, 220; 417/356; 464/102, 104

[56]                  References Cited

U.S. PATENT DOCUMENTS 5,125,805  6/1992  Fujiwara et al. ........................ 417/356
5,252,048  10/1993  Fujiwara et al. ........................ 418/220

FOREIGN PATENT DOCUMENTS 544401  2/1993  Japan ........................................ 418/56

*Primary Examiner*—John J. Vrablik
*Attorney, Agent, or Firm*—Cushman Darby & Cushman, LLP

[57]                  ABSTRACT

A fluid compressor having a rotational force transmitting mechanism. The mechanism comprises an Oldam portion, an Oldam ring and a second cylinder gearing. The Oldam portion is integral with a piston. The Oldam ring has a first pair of key grooves and a second pair of key grooves. The key grooves of the first pair extend at right angles to those of the second pair. The second cylinder bearing is fitted in the cylinder and has two projections fitted in the key grooves of the second pair. The Oldam ring is made of silicon nitride ceramic.

13 Claims, 11 Drawing Sheets

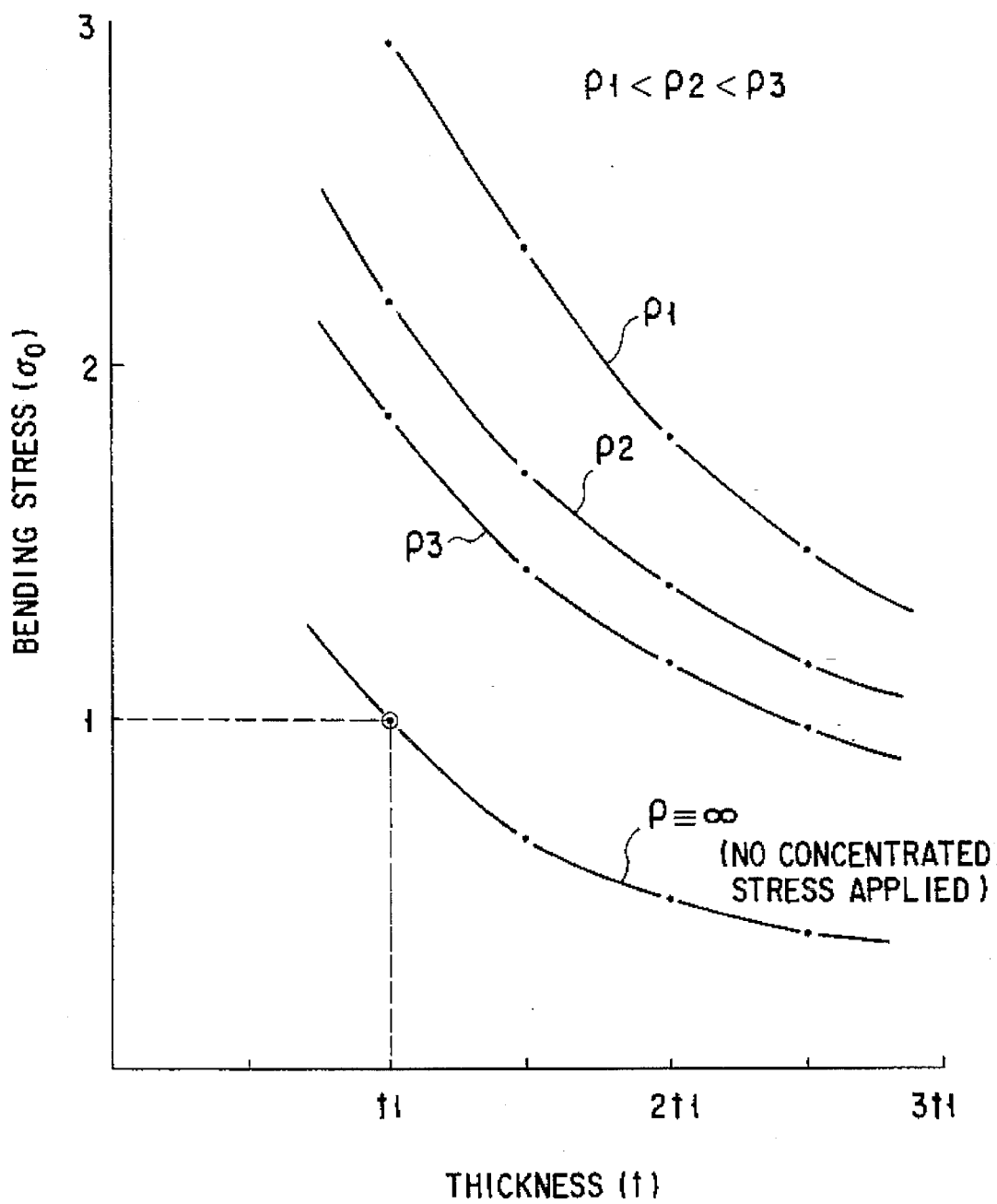
F I G. 10

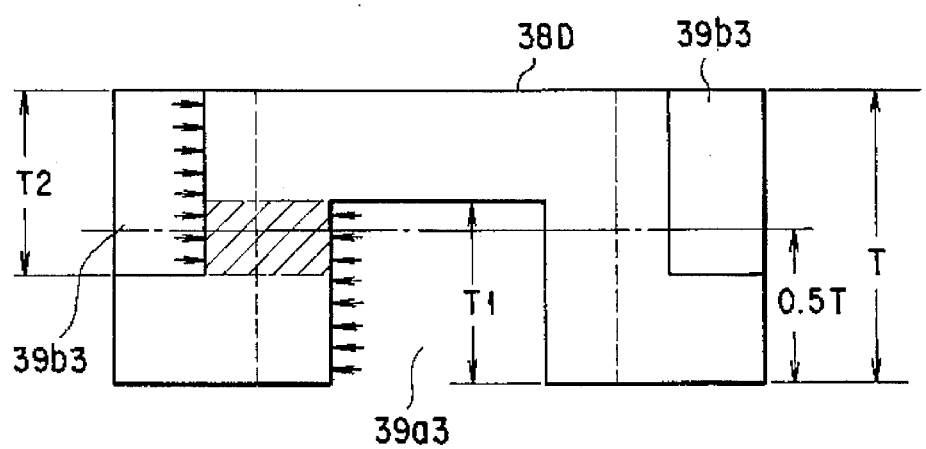
F I G. 20A
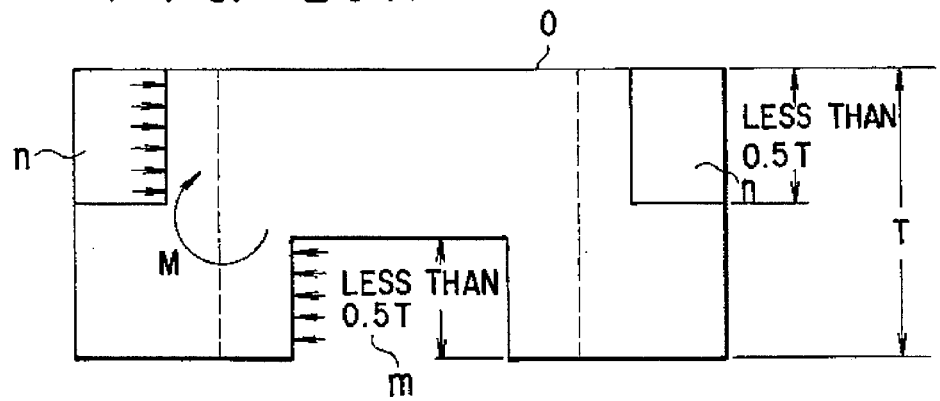
F I G. 20B
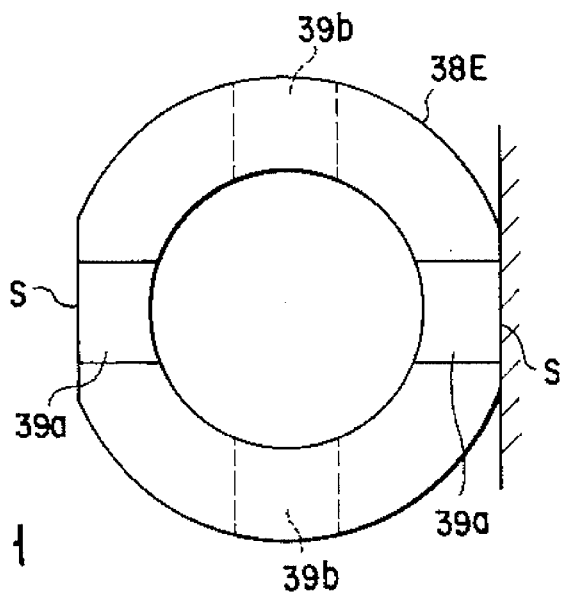
F I G. 21

ROTARY FLUID COMPRESSOR HAVING AN OLDHAM MECHANISM

BACKGROUND OF THE INVENTION

1. Field of the Invention

The present invention relates to a fluid compressor for compressing a refrigerant gas, designed for use in a refrigerating apparatus, for example.

2. Description of the Related Art

The applicants hereof have proposed a fluid compressor which comprises a sealed case, a cylinder located in the case, and a piston inserted in the cylinder. The piston is positioned eccentric to the cylinder and set in rolling contact with the inner circumferential surface of the cylinder. It has a helical groove cut in its circumferential surface and having a pitch gradually decreasing toward one end of the piston. A helical blade is loosely fitted in the helical groove. The blade partitions the annular space between the piston and the cylinder, defining a plurality of helical compression chambers. The chamber has a cross section gradually decreasing toward one end of the piston.

The fluid compressor has a mechanism. When the cylinder is rotated, the mechanism transmits a rotational force to the piston. The piston is thereby rotated, remaining eccentric to the cylinder. As the cylinder and the piston are rotated, a portion of each turn of the blade protrudes from the groove, while the diametrically opposite portion of the turn retracts into the groove.

As the cylinder and the piston are thus rotated, a medium to be compressed, e.g., a refrigerant gas, is drawn into the cylinder from a refrigerating circuit. The refrigerant gas flows to the gas-inlet end of the cylinder. In the cylinder, the gas and is gradually compressed in the cylinder until its pressure reaches a predetermined value. The gas is discharged from the compression chamber and guided into the refrigerating circuit.

Various types of mechanisms are known which can transmit a rotational force of the cylinder to the piston. The most popular of these is a so-called Oldam mechanism which comprises an oldham ring receiver to be coupled to the cylinder, a key section to be connected to the piston, and an oldham ring held by the oldham ring receiver and the key section and able to slide.

An oldham ring is a mechanical element which revolves around an object to which it transmits a force, while controlling the rotation of that object. If incorporated in a compressor of the above-mentioned type, the oldham ring needs to rotate as the cylinder and the piston are rotated. Since the oldham ring must rotate while revolving around the piston, it must be made of a suitable material. If made of a material having an excessive specific gravity (i.e., density), the oldham ring is likely to generate vibration, impact and noise.

The oldham ring may not be resistant to impact and may generate much vibration and noise if it has not been machined with precision in both shape and size. Furthermore, if not machined with precision, the oldham ring may wear to jeopardize the reliability of the fluid compressor in which it is used.

Jpn. Pat. Appln. KOKAI Publication No. 5-44401 suggest that an oldham ring for use in a scroll-type compressor be made of ceramics so as to be sufficiently resistant to impact, to generate but little vibration and noise, and to have sufficiently wear resistance. A oldham ring designed for use in a scroll-type compressor need not rotate around its axis; it needs only to revolve around an object. Hence, it is only required that the Oldam ring be sufficiently resistant to wear.

SUMMARY OF THE INVENTION

The object of the present invention is to provide a fluid compressor which has an oldham ring required to not only revolve but also rotate, being resistant to impact and wear and generating but little vibration and noise, and which is therefore improved in terms of reliability.

According to the present invention, there is provided a fluid compressor comprising: rotary drive means; a cylinder coupled to the rotary drive means and having two ends and an inner circumferential surface; two bearings supporting the ends of the cylinder; a piston inserted in the cylinder, set in rolling contact with the inner circumferential surface of the cylinder, located eccentric to the cylinder and having a circumferential surface, two ends, and having a helical groove formed in the outer circumferential surface and having a pitch gradually decreasing toward one end of the piston; a helical blade tightly fitted in the cylinder and loosely fitted in the helical groove such that a portion of each turn of the helical blade protrudes from the helical groove while a diametrically opposite portion of the turn retracts into the helical groove; a plurality of helical compression chambers defined by the helical blade, the inner circumferential surface of the cylinder and the circumferential surface of the piston, each having a cross section gradually decreasing toward the one end of the piston, and designed to compress a gas as the gas is forced toward the end end of the piston; and a transmitting mechanism connecting the cylinder and the piston, for transmitting a rotational force from the cylinder to the piston, thereby to rotate the piston. The transmitting mechanism is an oldham mechanism which comprises: a key section integral with the piston; an oldham ring made of silicon nitride ceramic and having a first group of key grooves in which the key section is slidably fitted, and a second group of key grooves which extend at right angles to the key grooves of the first group; and an oldham ring receiver having a key section slidably fitted in the grooves of the second group and coupled to the oldham ring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a diagram for explaining how the bending moment depends on the radius of groove-corner curvature of the oldham ring and on the thickness of each grooved portion of the ring;

FIG. 20A is a front view of a third modification of the oldham ring, which has relatively deep key grooves;

FIG. 20B is a front view of an oldham ring which falls outside the scope of the present invention; and FIG. 21 is a front view of a fourth modification of the oldham ring, which has two parallel reference surfaces.

DETAILED DESCRIPTION OF THE PREFERRED EMBODIMENTS

An embodiment of the present invention will be described, with reference to the accompanying drawings.

Figure 1:
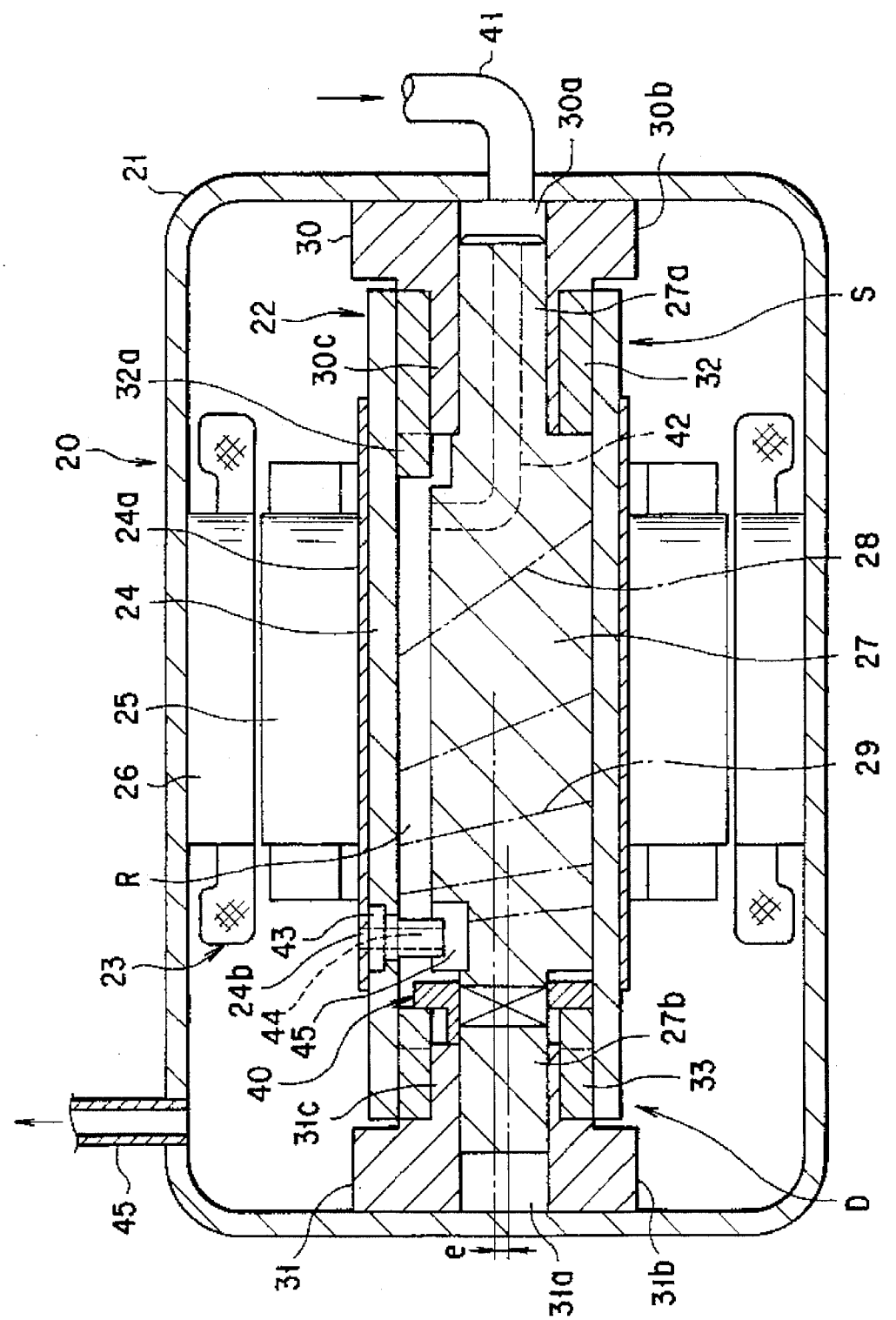
FIG. 1 is a longitudinal sectional view of a fluid compressor according to a first embodiment of the invention.

FIG. 1 shows the fluid compressor which is the first embodiment of the present invention. As shown in FIG. 1, the fluid compressor has a main body 20. The main body 20 comprises a case 21, a compression mechanism 22 and a motor section 23. The case 21 is a hollow cylinder which extends in horizontal direction and which is closed at both ends. Both the compression mechanism 22 and the motor section 23 are located in the case 21.

The compression mechanism 22 has a cylinder 24 and a cylinder cover 24a. The cover 24a is a hollow cylinder mounted on the outer circumferential surface of the cylinder 24. The motor section 23 comprises a hollow cylindrical rotor 25 and a hollow cylindrical stator 26. The rotor 25 is mounted on the cylinder cover 24, and the stator 26 is secured to the inner circumferential surface of the case 31 and surrounds the rotor 25.

The compression mechanism 22 further comprises a piston 27 inserted in the cylinder 24. The piston 27 is located eccentric thereto by a distance e such that its circumferential surface is set in line contact with the inner circumferential surface of the cylinder 24. The piston 27 has a helical groove 28 formed in its circumferential surface. The helical groove 28 has a pitch which gradually decreases toward one end of the piston 27.

A helical blade 29 is loosely fitted in the groove 28, so that a portion of each turn of the blade 29 may protrude from the groove while the diametrically opposite portion of the turn retracts into the groove. (In FIG. 1, the helical groove 28 and the helical blade 29 are indicated by one-dot, one-dash lines.) The helical blade 29 partitions the space between the cylinder 24 and the piston 27, defining a plurality of helical compression chambers R. The chambers R have a cross section gradually decreasing toward one end of the piston 27.

The piston 27 has a gas-inlet end S and a gas-outlet end D. A main shaft 27a and an auxiliary shaft 27b are formed integral with the ends S and D, respectively. The main shaft 27a is rotatably inserted in the through hole 30a formed in a main bearing 30 which is fixed to the inner surface of the gas-inlet end portion of the case 21. The auxiliary shaft 27b is rotatably inserted in the through hole 31a made in an auxiliary bearing 31 which is fixed to the inner surface of the gas-outlet end portion of the case 21. The holes 30a and 31b are coaxial to each other.

The main bearing 30 consists of a flange 30b fastened to the inner surface of the gas-inlet end portion of the case 21, and a shaft support 30c formed integral with the flange 30b and protruding therefrom. Similarly, the auxiliary bearing 31 consists of a flange 31b fastened to the inner surface of the gas-inlet end portion of the case 21, and a shaft support 31c formed integral with the flange 31b and protruding therefrom. The hole 30a is eccentric to the main bearing 30, and the hole 31b is eccentric to the auxiliary bearing 31. The shaft supports 30c and 31c are coaxial with the flanges 30b and 31b, respectively.

Cylinder bearings 32 and 33, both made of metal, are inserted in the gas-inlet end portion and gas-outlet end portion of the cylinder 24, respectively. The first cylinder bearing 32 is rotatably mounted on the shaft support 30c of the main bearing 30. The second cylinder bearing 33 is rotatably mounted on the shaft support 31c of the auxiliary bearing 30.

The first cylinder bearing 32 is a ring having a large wall thickness. Its outer end surface is flush with the surface of the gas-inlet end of the cylinder 24. The first cylinder bearing 32 has a projection 32a, which extends from the inner end surface and opposes the gas-inlet end of the helical blade 29. The projection 32a functions as a stopper, preventing the blade 29 from slipping out of the helical groove 28.

The second cylinder bearing 33 is a part of an oldham mechanism 40 (later described) which is designed to transmit a rotational force from the cylinder 24 to the piston 27.

A gas-inlet pipe 41 is connected at one end to the gas-inlet end of the case 21 and communicates with the through hole 30a of the main bearing 30. The other end of the pipe 41 is connected to, for example, an evaporator incorporated in a refrigeration system.

A gas passage 42 is formed partly in the main shaft 27a and partly in the gas-inlet end portion of the piston 27. The passage 42 extends from the end surface of the main shaft 27a along the axis thereof, is bent substantially at right angles, extends in the radial direction of the piston 27, and opens at the circumferential surface of the gas-inlet end portion of the piston 27.

A blade stopper 43 is located near the oldham mechanism 40. The blade stopper 43 has a distal end which extends into a recess 45 formed in the gas-outlet end portion of the piston 27. The blade stopper 43 opposes the gas-outlet end of the helical blade 29 and prevents the blade 29 from slipping out of the helical groove 28.

The blade stopper 43 has a gas-guiding hole 44 which extends in the radial direction of the cylinder 24. The gas-guiding hole 44 communicates at one end with the recess 45 and at the other end with a hole 24b made in the cylinder cover 24a. Hence, the holes 24b and 44 connects the outer of the cylinder 24 to the space provided between the cylinder 24 and the inner circumferential surface of the case 21.

A gas-outlet pipe 45 is connected at one end to the gas-outlet end portion of the case 21. The other end of the gas-outlet pipe 45 is connected to a condenser incorporated in the refrigeration system.

The oldham mechanism 40 will now be described in detail.

Figure 2:
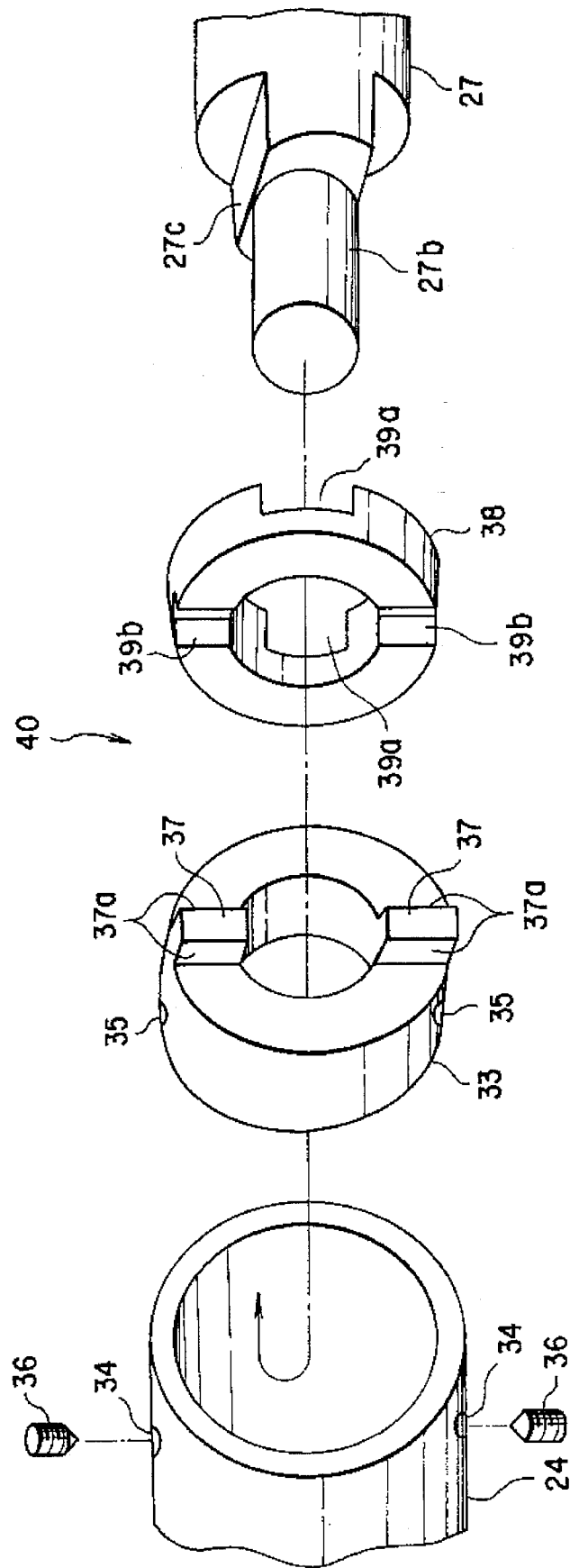
FIG. 2 is an exploded view of the oldham mechanism used in the compressor shown in FIG. 1.
Figure 3A:
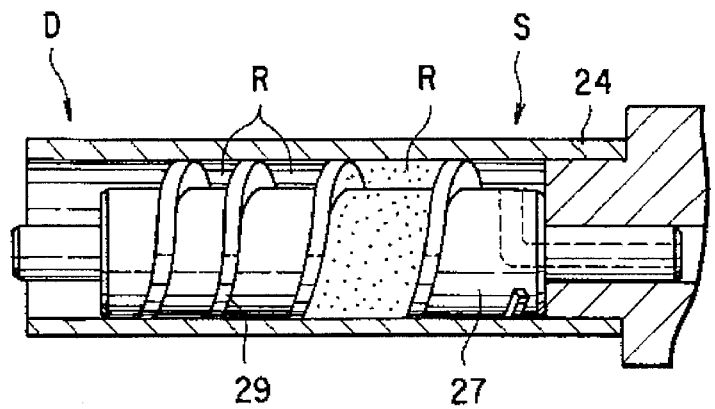
FIGS. 3A to 3D are diagrams explaining how the compressor compresses a fluid.
Figure 3B:
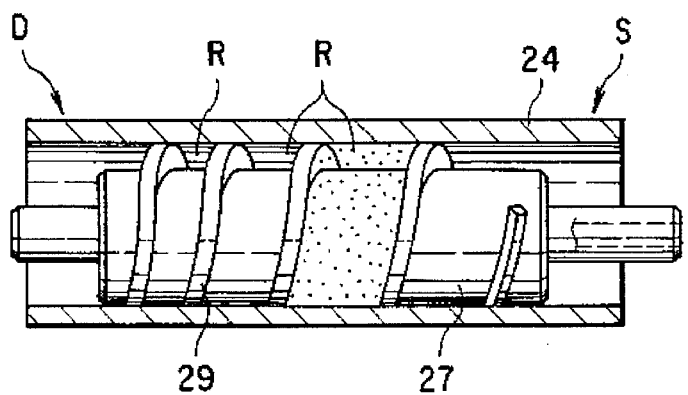
Figure 3C:
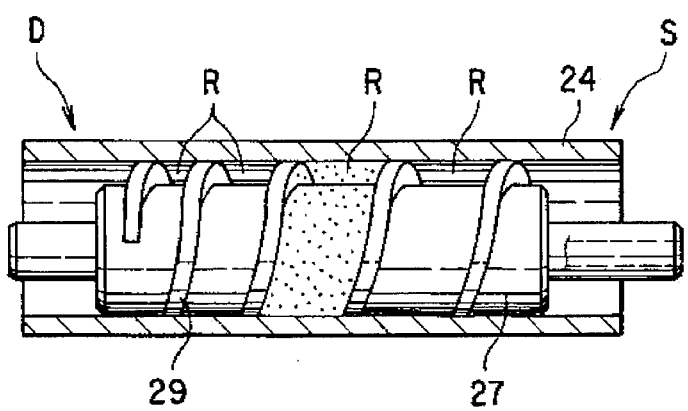
Figure 3D:
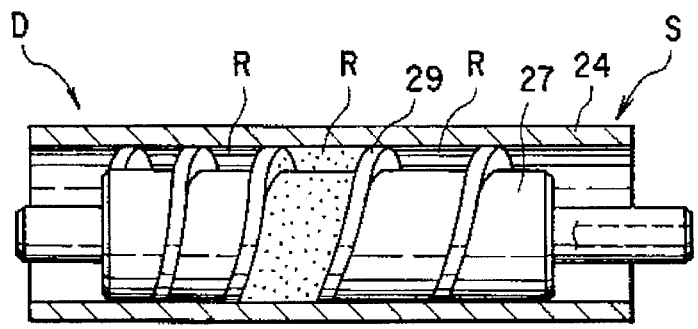

As shown in FIG. 2 which is an exploded view, the oldham mechanism 40, two screw holes 34 are formed in the gas-outlet end portion of the cylinder 24 and located almost diametrically opposite to each other. Two recesses 35 are formed in the outer circumferential surface of the second cylinder bearing 33 and are located almost diametrically opposite to each other.

In assembling the oldham mechanism 40, the second cylinder bearing 33 is inserted into the gas-outlet end portion of the cylinder 24 and rotated therein until the recesses 35 are set in axial alignment with the screw holes 34 of the cylinder 24. Then, stop screws 36 are driven into the screw holes 34 of the cylinder 24 and hence into the recesses 35 of the second cylinder bearing 33. The second cylinder bearing 33 is thereby fitted in the gas-outlet end portion of the cylinder 24 and fastened thereto.

The second cylinder bearing 33 is a ring having a large wall thickness. Once fitted in and fastened to the gas-outlet end portion of the cylinder 24, the bearing 33 has its outer end surface located flush with the surface of the gas-outlet end of the cylinder 24.

Two projections 37 protrude from the other end surface of the second cylinder bearing 33. They are formed integral with the bearing 33 and spaced apart by 180° C. along the circumference of the bearing 33 located diametrically opposite to each other. The projections 37 are positioned, so that that the distance between their inner ends is equal to the inner diameter of the bearing 33, and the distance between their outer ends is equal to the outer diameter of the bearing 33. The projections 37 are rectangular as viewed from the front. The left and right sides 37a, 37b of either projection 37 have been sufficiently polished.

The piston 27 has an oldham portion 27c at the gas-outlet end. The oldham portion 27c is made integral with the auxiliary shaft 27b and functions as a key. It has two flat sides which are exactly parallel to each other. The distance between the parallel sides of the oldham portion 27c is equal to or slightly greater than the diameter of the auxiliary shaft 27b.

An oldham ring 38 is interposed between the oldham portion 27c and the second cylinder bearing 33. Thus, the second cylinder bearing 33 functions as a so-called oldham-ring receiver. The oldham ring 38 has two key grooves 39a cut in one end surface, and other two key grooves 39b are cut in the opposite end surface. The key grooves 39a are spaced apart by 180° C. along the circumference of the oldham ring 38, and so are the key grooves 39b. The key grooves 39a extend at right angles to the key grooves 39b. The oldham ring 38 has an inner diameter larger than the diameter of the auxiliary shaft 27b, and an outer diameter almost equal to the diameter of the piston 27.

The oldham mechanism 40 comprises the second cylinder bearing 33, the oldham portion 27c of the piston 27 and the oldham ring 38. The oldham portion 27c is fitted and can slide in the key grooves 39a of the oldham ring 38. The projections 37 of the second cylinder bearing 33 are fitted in the key grooves 39b of the oldham ring 38 and can slide therein.

Figure 4:
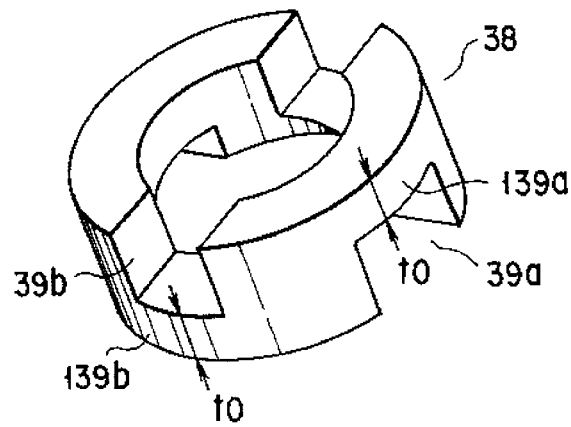
FIG. 4 is a perspective view of the oldham ring incorporated in the oldham mechanism, showing the thickness of the grooved parts of the oldham ring.
Figure 5:
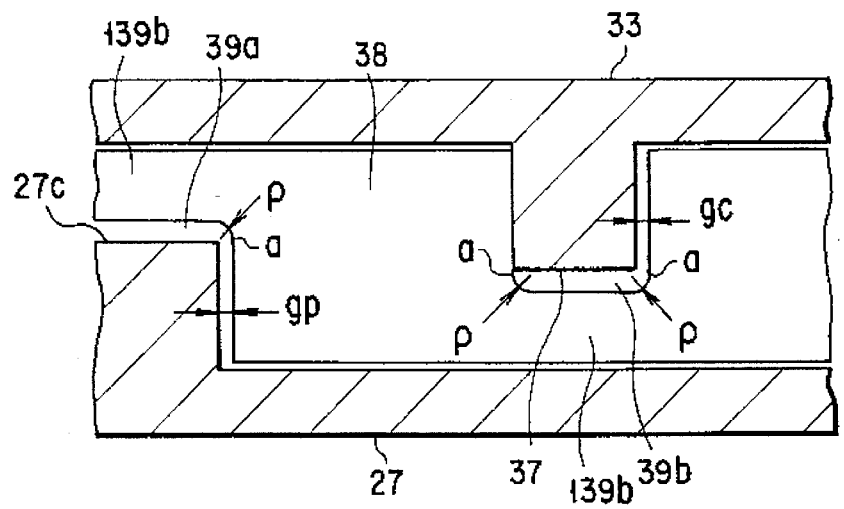
FIG. 5 is a diagram showing the gap between the oldham ring and the piston of the compressor and also the gap between the ring and the second cylinder bearing of the compressor.

The oldham ring 38 is made of silicon nitride ceramic ($Si_3N_4$). The grooved portions 139a and 139b of the oldham ring 38 have a thickness $t_0$ as shown in FIG. 4. The thickness $t_0$ is set at 2 to 5 mm for the reason which will be described later. As shown in FIG. 5, the corners a of the key grooves 39a and 39b are rounded. The radius $\rho$ of curvature of the corners a is set at a minimum value of 0.2 mm and at a maximum value of 2 to 5 mm (= thickness $t_0$).

At normal temperature, there are provided a gap $g_p$ between the oldham portion 27c and either key groove 39a and a gap $g_c$ between either projection 37 and either key groove 39b. These gaps $g_p$ and $g_c$ are set at such values that their sum is 500 μm or less, for the specific reason which will be described later.

When electric power is supplied to the motor section 23, the rotor 25 and the cylinder 24 rotate together. Then, both cylinder bearings 32 and 33 are rotated since they are integral with the cylinder 24. As the second cylinder bearing 33 rotates, the Oldam ring 38 is rotated since the projections 37 of the bearing 33 are fitted in the key grooves 39b of the oldham ring 38 and can slide therein. The rotational force of the oldham ring 38 is transmitted to the piston 27. This is because the oldham portion 27c of the piston 27 is fitted and can slide in the key grooves 39a of the oldham ring 38.

By virtue of the oldham ring 38, the cylinder 24 and the piston 27 rotate synchronously at different circumferential speeds determined by their radii, while remaining eccentric to each other. As the cylinder 24 and the piston 27 rotate in this way, the helical blade 29 is rotated such that a portion of each turn of the helical blade 29 protrudes from the helical groove 28, while the diametrically opposite portion of the turn retracts into the helical groove 28.

In the meantime, the refrigerant gas is drawn into the case 21 through the gas-inlet pipe 41 from the refrigerating circuit of the refrigeration system. The gas flows into the cylinder 24 through the hole 30a of the main bearing 30 and through the gas passage 42. Then, as shown in FIGS. 3A to 3D, the refrigerant gas is made to flow through the helical compression chamber R, from the gas-inlet end to gas-outlet end of the chamber R, since the helical blade 29 keeps rotating. The refrigerant gas is gradually compressed as it is forced through the chamber R, the cross section of which gradually decreases toward one end of the piston 27. The gas is compressed to a predetermined pressure when it reaches the gas-outlet end D of the piston 27.

The compressed, high-pressure gas is guided from the chamber R into the space which is provided between the cylinder 24 and the inner circumferential surface of the case 21 through the gas-guiding hole 44 and the hole 24b. Having filled up this space, the high-pressure gas flows out of the case 21 through the gas outlet pipe 45 into the refrigerating cycle of the refrigeration system.

As mentioned above, the oldham ring 38 is made of silicon nitride ceramic ($Si_3N_4$). Silicon nitride ceramic has a specific gravity of 3.2, which is half or less the specific gravity of iron-based material. The use of this ceramic as the material of the oldham ring 38 serves to reduce the weight of the compression mechanism 22, and ultimately the weight of the fluid compressor.

In addition, silicon nitride ceramic exhibits greater resistance to impact than any other ceramic materials. Hence, the oldham ring 38 generates but little vibration and noise, serving to enhance the durability of the fluid compressor.

As described above, the first cylinder bearing 32 is interposed between the inner circumferential surface of the cylinder 24 and the shaft support 30c of the main bearing 30, whereas the second cylinder bearing 33 is interposed between the inner circumferential surface of the cylinder 24 and the shaft support 31c of the auxiliary bearing 31. Therefore, the cylinder bearings 32 and 33 slide only at low speed. This helps to minimize the energy loss resulting from the sliding of components.

The second cylinder bearing 33, which has a pair of projections 37 protruding from its gas-outlet end, functions as a so-called oldham-ring receiver and constitutes a part of the oldham mechanism 40. Thus, the second cylinder bearing 33 supports not only the cylinder 27 but also the oldham ring 38, making it unnecessary for the oldham mechanism 40 to have a member which serves as an oldham-ring receiver only. This helps to reduce the number of parts constituting the fluid compressor and, ultimately, to decrease the manufacturing cost thereof. Furthermore, the second cylinder bearing 33 serves to reduce the length of the compression mechanism 22 by the wall thickness of a conventional oldham-ring receiver.

As indicated above with reference to FIGS. 4 and 5, the grooved portions 139a and 139b of the oldham ring 38, which is made of silicon nitride ceramic, have a thickness $t_0$ set at 2 to 5 mm, and the rounded corners a of the key grooves 39a and 39b of the oldham ring 38 have a radius ρ of curvature set at a minimum value of 0.2 mm and at a maximum value of 2 to 5 mm (= thickness $t_0$). As indicated above, too, the gap $g_p$ between the oldham portion 27c and either key groove 39a and the gap $g_c$ between either projection 37 and either key groove 39b have a total value of 500 μm or less. Due to these mechanical features and for the following reasons, the oldham ring 38 is resistant to impact and generates but little vibration and noise, serving to enhance the reliability of the fluid compressor.

First, the fatigue of the oldham ring 38 and rupture of the oldham ring 38 which may occur at the start of the oldham mechanism 40 will be explained.

The cylinder 24 generates torque while rotating. The torque is transmitted from the projections 37 of the second cylinder bearing 33, formed integral with the cylinder 24, to the oldham portion 27c of the piston 27. Two types of stress are applied on the oldham ring 38, one from the projections 37 and the other from the oldham portion 27c.

The first stress is one which is repeatedly applied to the oldham ring 38 as the torque of the cylinder 24 changes. If the first stress increases over a certain value and is applied to the oldham ring 38 a certain number of times, the oldham ring 38 will be critically fatigued and subsequently broken.

The second stress is an impact stress which is applied to the oldham ring 38 at the start of the Oldam mechanism 40. The impact stress is applied, inevitably because two gaps are provided respectively between the oldham portion 27c and either key groove 39a and between either projection 37 and either key groove 39b so that the oldham portion 27c and the projections 37 may freely slide in the key grooves 39a and 39b. The oldham ring 38 is made of ceramic material, whereas both the oldham portion 27c and the second cylinder bearing 33 are made of metal. Hence, if the impact stress overcomes the bending strength of the ceramic material, the oldham ring 38 will be broken.

Therefore, the oldham ring 38 made of ceramic material must be designed to overcome both types of stress specified above. It is also necessary to decrease the contact load the oldham portion 27c and the second cylinder bearing 33 exert on the oldham ring 38, thereby to prevent an excessive wear of the oldham ring 38.

Figure 6:
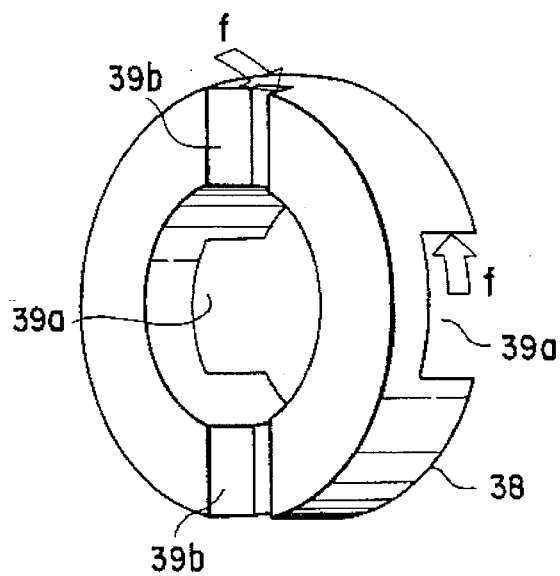
FIG. 6 is a perspective view of the oldham ring, explaining how forces act on the oldham ring.

As the cylinder 24 is rotated, the oldham ring 38 is rotated since the projections 37 of the second cylinder bearing 33 can slide in the key grooves 39b of the oldham ring 38. The torque of the oldham ring 38 is transmitted to the piston 27 since the Oldham portion 27c can slide in the key grooves 39a. Hence, while the cylinder 24 is being rotated, the oldham ring 38 receives load f at four portions, namely at the walls of the key grooves 39a and 39b, as indicated by the arrows shown in FIG. 6.

Figure 7:
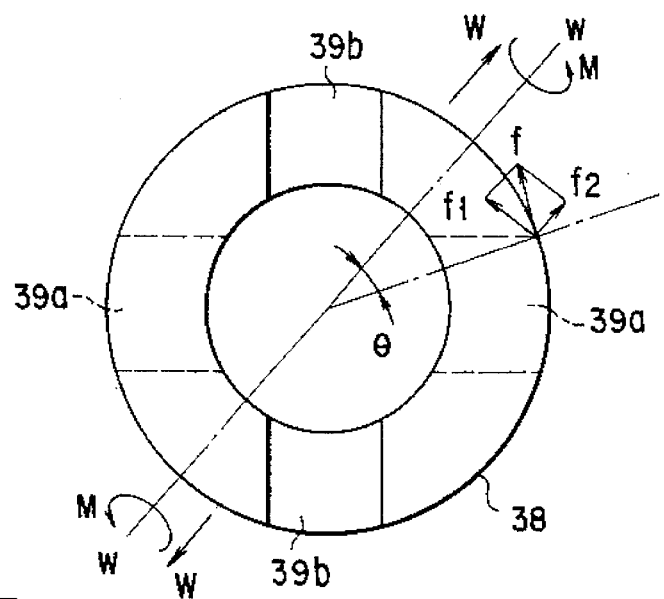
FIG. 7 is a plan view of the oldham ring, explaining how forces act on the Oldam ring.
Figure 8:
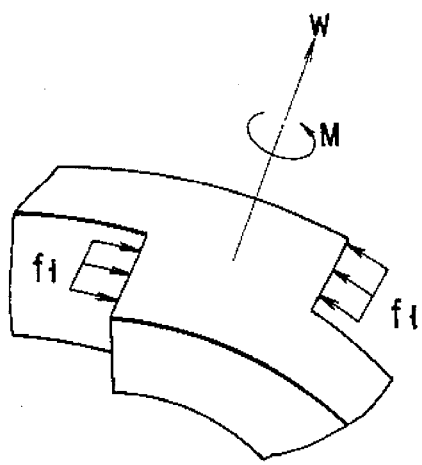
FIG. 8 is a perspective view of a part of the oldham ring, explaining how forces act on the oldham ring.

The load f applied on each of the four portions of the oldham ring 38 is divided into two component f1 and f2 as illustrated in FIG. 7. The component f2 acts as a force W pulling the oldham ring 38 along an axis W. The component f1 works as a bending moment M on the oldham ring 38, around the axis W as shown in FIG. 8. The components f1 and f2 are given as follows:

$$f1 = f \cos\theta$$
$$f2 = f \sin\theta \qquad (1)$$

where θ is the angle between the axis W and the line connecting the center of the ring 38 and the point at the load f is applied.

The angle θ must be 20° to 30°. Otherwise the oldham mechanism would fail to perform its function. Obviously, the component f1 is greater than the component f2. As a result, the stress generated from the bending moment M is several times greater than the pulling force W. It is no doubt the bending moment M which may fatigue the oldham ring 38 and may, in worst case, break the Oldam ring 38.

Figure 9:
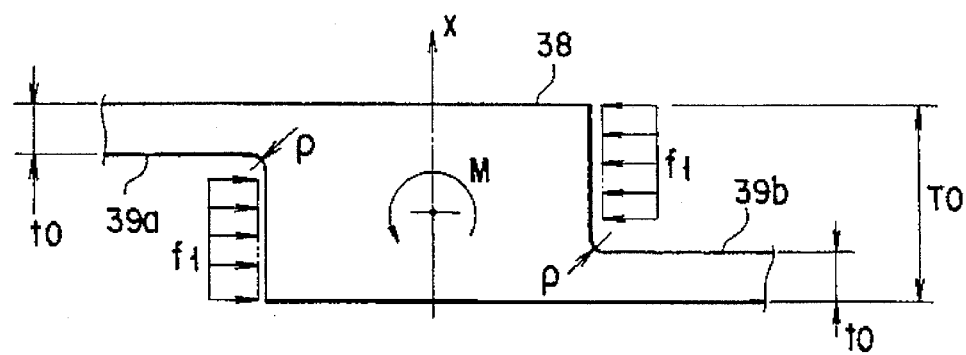
FIG. 9 is a diagram explaining how a bending moment is applied to the oldham ring.

From FIG. 9 it is evident that the bending moment M and the component f1 have the following relationship:

$$M = 2 \int_{T_0/2 - t_0 - \rho}^{T_0/2} \frac{f1}{(T_0 - t_0 - \rho)} \cdot x \cdot dx \qquad (2)$$

where $T_0$ is the length of the oldham ring 38, $t_0$ is the thickness of each of the grooved portions 139a and 139b of the ring 38, and ρ is the radius of curvature of either corner of each key groove.

The bending moment M is given as follows, provided that the radius ρ is far less than $(T_0/2-t_0)$ or $(T_0-t_0)$:

$$M = f1 \cdot t_0 \quad (3)$$

That is, the bending moment M is proportional to the thickness $t_0$ of each of the grooved portions 139a and 139b. As can be understood from the following formula, a bending stress $\sigma_0$ generated from the bending moment M is proportional to the bending moment M and inversely proportional to the square of the thickness $t_0$.

$$\sigma_0 \propto \frac{M}{t_0^2} \propto \frac{f1}{t_0} \quad (4)$$

Since the stress is concentrated at the corners of the grooved portions 139a and 139b of the oldham ring 38, the maximum bending stress $\sigma_{max}$ equals the bending stress $\sigma_0$ multiplied by a stress concentration coefficient which corresponds to the radius ρ of curvature.

FIG. 10 represents the ρ-dependency of the bending stress $\sigma_0$ and that of the thickness t of the grooved portions 139a and 139b. In FIG. 10, a curve ρ1 shows the relationship which $\rho_0$ and t have when the radius ρ is 0.1 mm; a curve ρ2 indicates the relationship which $\rho_0$ and t have when the radius ρ is 0.3 mm; and a curve ρ3 represents the relationship which $\rho_0$ and t have when the radius ρ is 0.5 mm. The value the bending stress $\sigma_0$ has when the thickness t is t1 and when the radius ρ is infinitely great is used as a reference. As clearly seen from FIG. 10, the bending stress $\sigma_0$ decreases as the radius ρ increases and as the thickness t increases.

Figure 11:
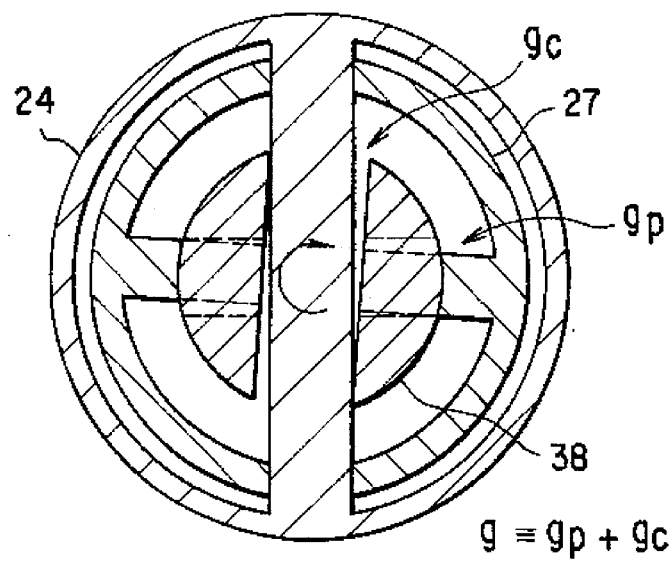
FIG. 11 is a cross-sectional view illustrating the gap between the oldham ring and the piston and the gap between the ring and the cylinder.

At the start of the fluid compressor, an impact stress is applied to the oldham ring 38, due to the two gaps are provided respectively between the oldham portion 27c and either key groove 39a and between either projection 37 and either key groove 39b. Therefore, the bending stress $\sigma_d$ exerted on the ring 38 at the start of the fluid compressor includes that impact stress. This stress $\sigma_d$, which will be called "dynamic stress," will be compared with the stress $\sigma_0$, or "static stress," applied on the ring 38 while the compressor is operating. The dynamic stress $\sigma_d$ is represented as:

$$\sigma_d = \sigma_0 \left\{ 1 + \sqrt{1 + \left(\frac{g}{X_0}\right)} \right\} \quad (5)$$

where $X_0$ is the static displacement of the oldham ring 38, which corresponds to the static stress $\sigma_0$, g is, as seen from FIG. 11, the sum of the gap $g_c$ between either projection 37 and either key groove 39b and the gap $g_p$ between the oldham portion 27c and either key groove 39a. Namely, $g = g_c + g_p$.

Figure 12:
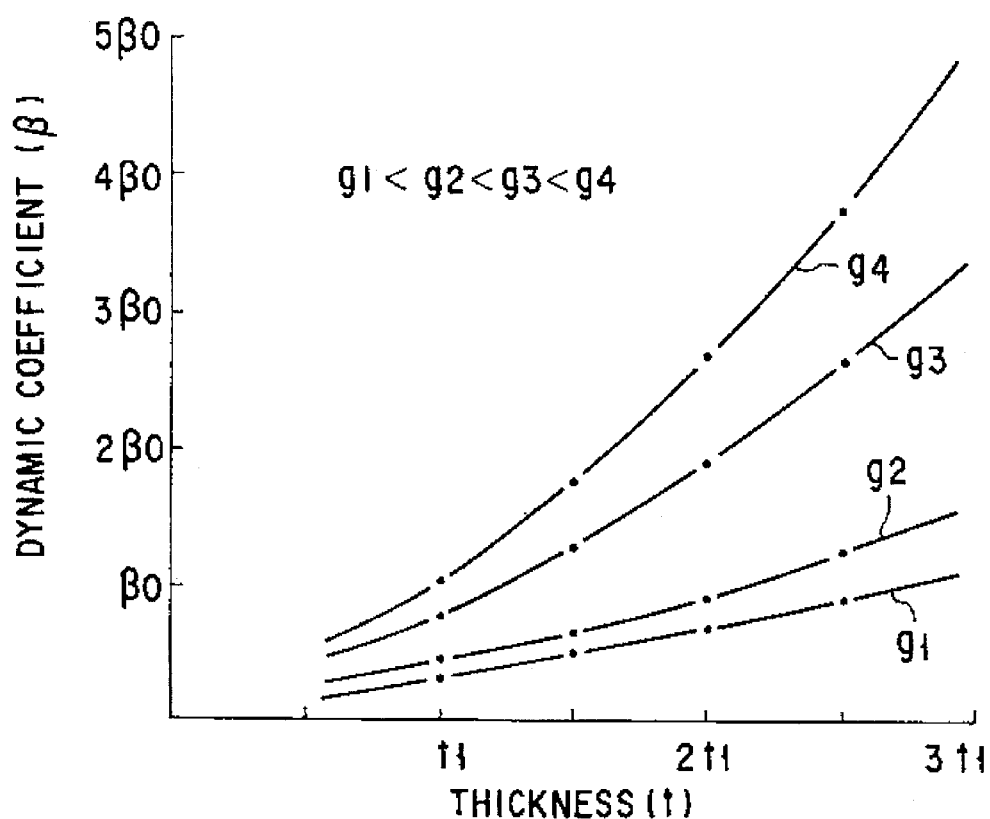
FIG. 12 is a diagram showing how the dynamic coefficient depends on the gap between the oldham ring and the piston, the gap between the ring and the cylinder, and the thickness of each grooved part of the ring.

FIG. 12 shows how a dynamic coefficient β, which is defined by the following formula, depends on the gaps $g_c$ an $g_p$ and the thickness t of each grooved portion of the ring. In FIG. 12, a curve $g_1$ indicates the relationship which the coefficient β and the thickness t have when g is 50 μm, a curve $g_2$ represents the relationship which β and t have when g is 100 μm each, a curve $g_3$ illustrates the relationship which β and t have when g is 500 μm, and a curve $g_4$ illustrates the relationship which β and t have when g is 1000 μm.

$$\beta = \left\{ 1 + \sqrt{1 + 2\frac{g}{X_0}} \right\} \quad (6)$$

As can be understood from the formula (6), the dynamic coefficient β increases with the thickness t of each grooved portion if the sum g of the gaps $g_c$ and $g_p$ remains unchanged. This is because the static displacement $X_0$ of the oldham ring 38 decreases as the thickness t increases. On the other hand, if the thickness t remains unchanged, the dynamic coefficient β increases with the sum g of the gaps $g_c$ and $g_p$.

Figure 13:
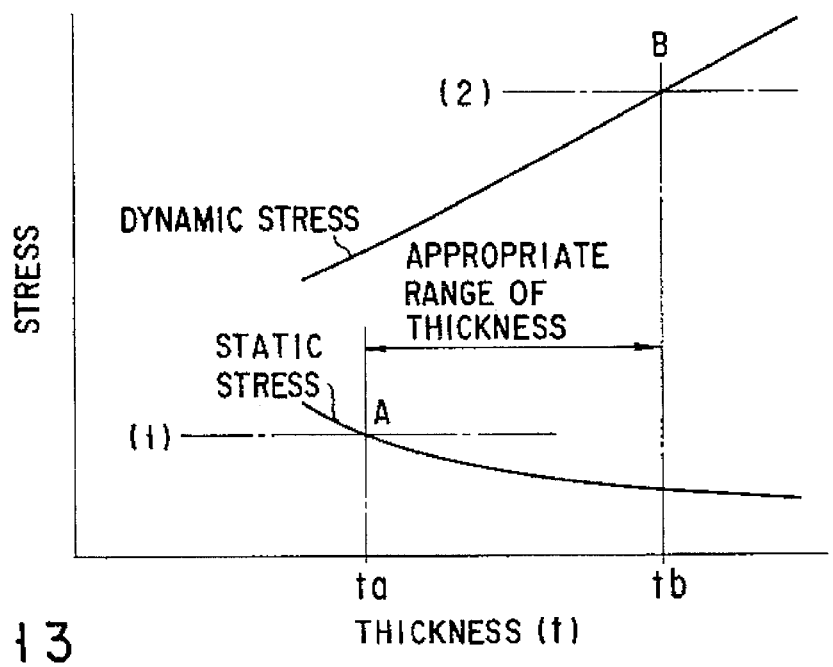
FIG. 13 is a diagram showing how the static stress and the dynamic stress depend on the thickness of each grooved portion of the oldham ring when the sum of the gap $g_c$ between the ring and the piston and the gap between the ring and the cylinder is constant and when the corner of each groove of the oldham ring 38 has a specific radius of curvature.

FIG. 13 shows how the static stress and the dynamic stress depend on the thickness t when the sum g of the gaps $g_c$ and $g_p$ is constant and when the corner of each groove of the Oldam ring 38 has a specific radius of curvature. As evident from FIG. 13, the static stress decreases in inverse proportion to the thickness t, whereas the dynamic stress increases in proportion to the thickness t. Since the static stress is repeatedly applied to the oldham ring 38 as the torque of the cylinder 24 changes, it is required that the static stress be less than the fatigue indicated by the line (1). Obviously, the thickness t must be $t_a$ or more.

Since an impact is applied on the oldham ring 38 only at the start of the fluid compressor, it is unnecessary to design the oldham ring 38 not to be fatigued over a long operation of the fluid compressor. Nonetheless, if the dynamic stress exceeds the bending stress indicated by the line (2) shown in FIG. 13, the oldham ring 38 will be broken instantaneously. The dynamic stress must be equal to or less than the bending stress. The thickness t needs to be $t_b$ or less.

Therefore, the grooved portions 139a and 139b of the oldham ring 38 need to have a thickness which falls within the range of $t_a$ to $t_b$.

In view of the circumstances mentioned above, the fluid compressor is designed to have the following three aspects:

FIRST ASPECT

The grooved portions 139a and 139b of the oldham ring 38 have a thickness $t_0$ ranging from 2 to 5 mm. The thickness $t_0$ must be at least 2 mm so that the oldham ring 38 may remain integral despite the static stress it has repeatedly received over a long operation of the fluid compressor. The thickness $t_0$ must be at most 5 mm so that the oldham ring 38 may remain integral despite the impact it receives at every start of the fluid compressor.

SECOND ASPECT

The rounded corners a of the key grooves 39a and 39b of the oldham ring 38 have a radius ρ of curvature of 0.2 mm at minimum and at 2 to 5 mm (= thickness $t_0$) at maximum. The radius ρ must be at least 0.2 mm in view of the concentration of stress which has been explained with reference to FIG. 10. There are two reasons why the radius ρ should not exceed the thickness $t_0$ (2 to 5 mm) of each grooved portion of the oldham ring 38. First, the average bending moment increases with the radius ρ as seen from the equation (2), though the radius ρ should better be as large as possible if the bending moment M remains constant. Second, the force $f_1/(T_0-t_0-\rho)$ shown in the equation (2), which the oldham portion 27c applies over unit length of the oldham ring 38 (made of ceramic), should preferably be reduced to a specific value in order to prevent an excess wear of the oldham ring 38.

THIRD ASPECT

The gap $g_p$ between the oldham portion 27c and either key groove 39a and the gap $g_c$ between either projection 37 and either key groove 39b have a total value of 500 μm or less. If the sum of the gaps $g_p$ and $g_c$ exceeds 500 μm, the oldham ring 38 will possibly be broken when an impact is exerted on the ring 38 at the start of the fluid compressor as may be understood from the g-dependency of the dynamic coefficient β shown in FIG. 12.

Having the three aspects described above, the oldham ring 38 made of silicon nitride ceramic excels in three respects. First, it is very resistant to fatigue caused by the torque changing during the operation of the fluid compressor. Second, it is resistant to the impact applied at the start of the compressor. Third, it is sufficiently resistant to wear.

Figure 14:
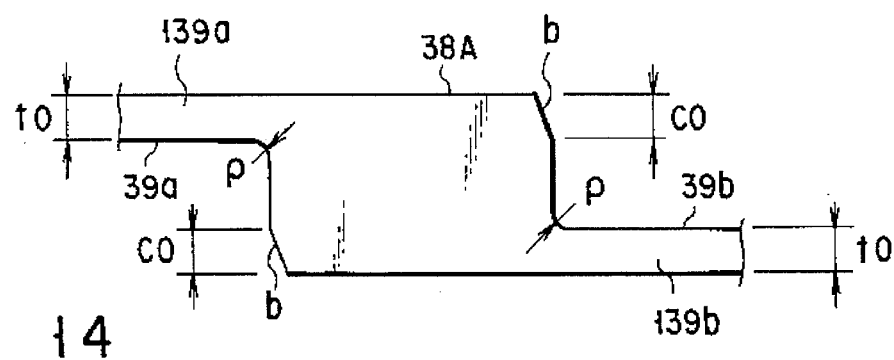
FIG. 14 is a sectional view of a first modified oldham ring according to this invention.

FIG. 14 shows a first modified Oldam ring 38A. The oldham ring 38A is characterized in that key grooves 39a and 39b have slanted edge portions b. Each slanted edge portion b has a height $C_0$ which is 0.1 to 2.0 times the thickness t0 of the grooved portions 139a and 139b of the ring 38A. Neither the oldham portion 27c of the piston 27 nor the projections 37 of the second cylinder bearing 33 contact the ring 38A at the slanted edge portions b. Hence, the oldham ring 38A has a smaller area at which it contacts the oldham portion 27c and the projections 37, than the oldham ring 38 shown in FIGS. 4 to 9. Inevitably, a higher pressure is applied to the ring 38A, increasing the wear to some degree. Nonetheless, the oldham ring 38A is much more resistant to fatigue and impact because it receives but a bending moment M far less than the oldham ring 38 (FIGS. 4–9).

Figure 15:
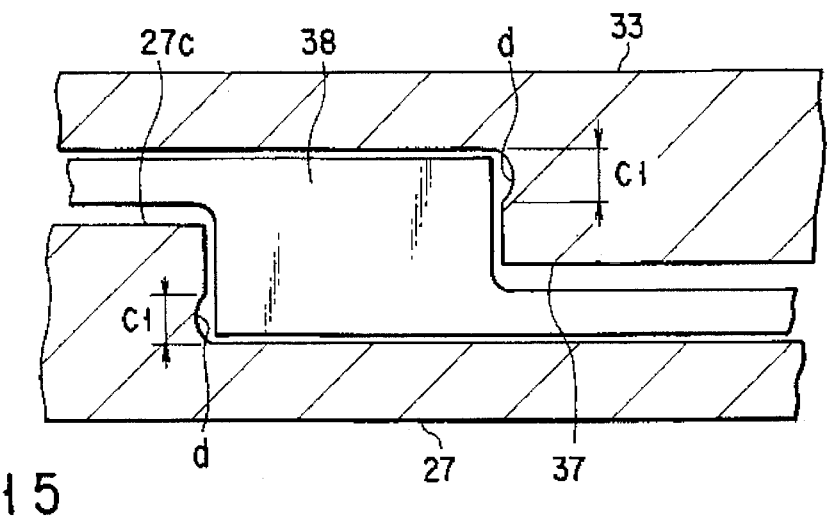
FIG. 15 is a sectional view of a second modified oldham ring according to the invention.

FIG. 15 shows a modification of the fluid compressor. The modified fluid compressor is characterized in that the oldham portion 27c of the piston 27 and either projection 37 of the cylinder bearing 33 have a shallow U-groove d at their roots. The U-grooves 37 have a depth $c_1$. By virtue of the U-grooves 37, the oldham ring 38 contacts the oldham portion 27c and the projections 37 at a smaller area than in the fluid compressor shown in FIG. 1. Inevitably, a higher pressure is applied to the ring 38, increasing the wear to some degree. Nonetheless, the bending moment M applied on the ring 38 is far less than in the compressor of FIG. 1, whereby the oldham ring 38 is much less fatigued and receives a far smaller impact. Each U-groove d is shaped differently from that of that edge portion of the oldham ring 38A (FIG. 14) which has been cut off to form the slanted edge portion b. It does not matter whatever shape the U-groove d has, provided that the U-groove d has an appropriate width $C_1$ which is 0.1 to 2.0 times the thickness t0 of the grooved portions 139a and 139b of the ring 38A.

As has been described, the fluid compressor according to the first embodiment of the invention comprises the oldham mechanism for transmitting a rotational force from the cylinder to the piston. The mechanism has an oldham ring which is made of silicon nitride ceramic. The oldham ring, which needs to not only revolve but also rotate, has but a small specific density. Further, since silicon nitride ceramic is more resistant to impact than any other ceramic materials, the oldham ring generates but little vibration and noise, serving to enhance the durability and reliability of the fluid compressor.

Moreover, since the second cylinder bearing made of metal functions as an oldham-ring receiver and makes it unnecessary to use an oldham-ring receiver, the fluid compressor comprises less components than otherwise and can, therefore, be manufactured at a low cost.

In addition, since its grooved portions have a thickness of 2 mm at minimum, the oldham ring can remain integral despite the static stress it receives many times during the operation of the fluid compressor. Since its grooved portions have a thickness of 5 mm at maximum, the oldham ring can remain integral despite the impact it receives at every start of the fluid compressor.

Furthermore, since the rounded corners of the key grooves of the oldham ring have a radius ρ of curvature of at least 0.2 mm, no excessive bending stress is applied to the corners of each key groove. Also, since the radius ρ is at most 2 to 5 mm, i.e., the thickness of the grooved portions of the oldham ring, the pressure applied on the Oldam ring is reduced, wherein an excess wear of the Oldam ring is prevented.

Still further, since the gap between the oldham portion and the key grooves and the gap between the projections and the other key grooves have a total value of 500 μm or less, the oldham ring can remain integral despite the impact it receives at the start of the compressor, improving the durability of the fluid compressor.

In the modified oldham ring (FIG. 14), the key grooves have slanted edge portions having a height which is 0.1 to 2.0 times the thickness of the grooved portions. Due to the slanted edge portions, the Oldam ring contacts the oldham portion and the projections at a smaller area than otherwise, and a relatively low pressure is applied to the oldham ring. As a result, the first modified oldham ring receives but a relatively small bending moment, and is therefore sufficiently resistant to fatigue and impact because it receives.

In the modified fluid compressor, the oldham portion of the piston and either projection of the second cylinder bearing have a shallow U-groove the width of which is 0.1 to 2.0 times the thickness t0 of the grooved portions of the oldham ring. By virtue of the U-grooves, the oldham ring contacts the oldham portion and the projections at a small area. Therefore, only a very small bending moment is applied on the oldham ring, whereby the oldham ring is much less fatigued and receives a very small impact.

FIGS. 16 to 18, FIGS. 19A, 19B, 20A and 20B, and FIG. 21 relate to a fluid compressor according to a second embodiment of the present invention.

Figure 16:
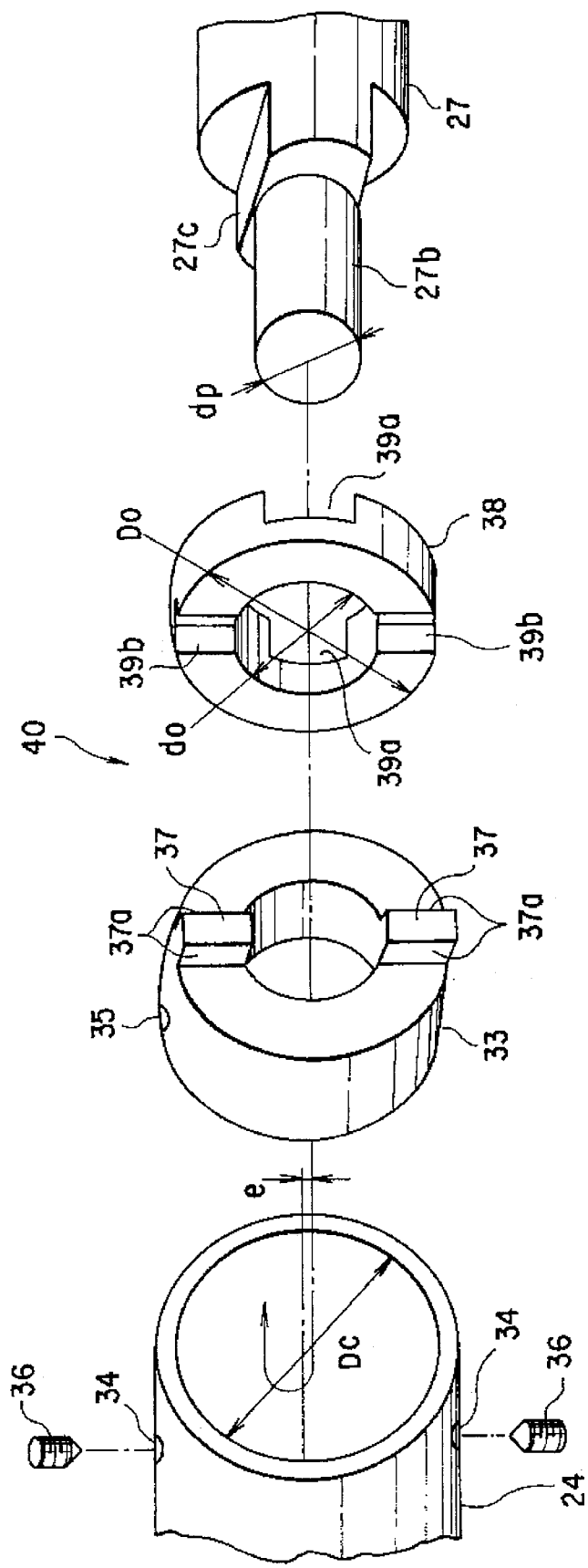
FIG. 16 is an exploded view of the oldham mechanism for use in a fluid compressor which is a second embodiment of the present invention.

FIG. 16 is an exploded view of an oldham mechanism 40 for use in the second embodiment. As FIG. 16 shows, the oldham mechanism 40 is identical in basic structure to the oldham mechanism shown in FIG. 2. That is, a piston 27 is arranged in a cylinder 24, eccentric thereto, and has an auxiliary shaft 27b and an oldham portion 27c made integral with the shaft 27b.

The oldham mechanism 40 comprises a second cylinder bearing 33 is inserted in the gas-outlet end portion of the cylinder 24 and an oldham ring 38. The second cylinder bearing 33 has a pair of projections 37 which protrude from one end surface. The oldham ring 38 has key grooves 39a, which are formed in one end surface and in which the oldham portion 27c of the piston 27 are fitted and can slide. The oldham ring 38 has other key grooves 39b, which are formed in the other end surface and in which the projections 37 of the bearing 33 are fitted and can slide. The key grooves 39a extend at right angles to the key grooves 39b.

The cylinder 24, the auxiliary shaft 27b and the oldham ring 38 have such sizes, and the cylinder 24 and the piston 27 are so positioned, that the following relationships are satisfied:

D0< (Dc−2e)

d0> (dp+2e)

where Dc is the inner diameter of the cylinder 24, dp is the diameter of the auxiliary shaft 27b, D0 is the outer diameter of the oldham ring 38, d0 is the inner diameter of the Oldham ring 38, and e is the distance by which the piston 27 is eccentric to the cylinder 24.

Therefore, the oldham ring 38 contacts neither the cylinder 24 nor the auxiliary shaft 27b. Hence, the oldham ring 38 does not vibrate or make noise, and serves to enhance the reliability of the fluid compressor.

It is desirable that the oldham mechanism 40 satisfy the following relationship:

(D0–d0)>2e

If this relationship is satisfied, as well as the relationship of D0< (Dc–2e) and the relationship of do> (dp+2e), the oldham portion 27c and the projections 37 contact the walls of the key grooves 39a and 39b at a sufficiently large area, reducing the pressure which the components 27c and 37 exert on the oldham ring 38.

Figure 17:
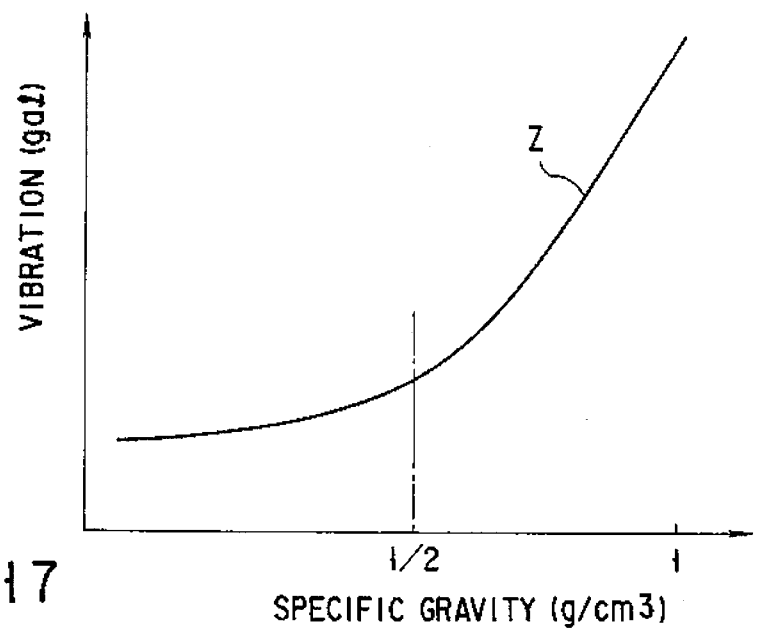
FIG. 17 is a diagram representing the relationship between the specific gravity of the oldham ring used in the modified oldham mechanism and the vibration of the fluid compressor incorporating the oldham mechanism.

FIG. 17 is a diagram representing the relationship Z which the specific gravity of the oldham ring 38 and the vibration of the fluid compressor actually have. In FIG. 17, the specific gravity is plotted on the abscissa, and the magnitude of vibration on the ordinate. As is evident from FIG. 17, the vibration can be greatly suppressed if the oldham ring 38 has a specific gravity which is half or less the specific gravity of iron-based material. The oldham ring 38 is made of silicon nitride ceramic whose specific gravity is 3.2 which is half or less the specific gravity of iron-based material. The oldham ring 38 vibrates but only a very little.

Figure 18:
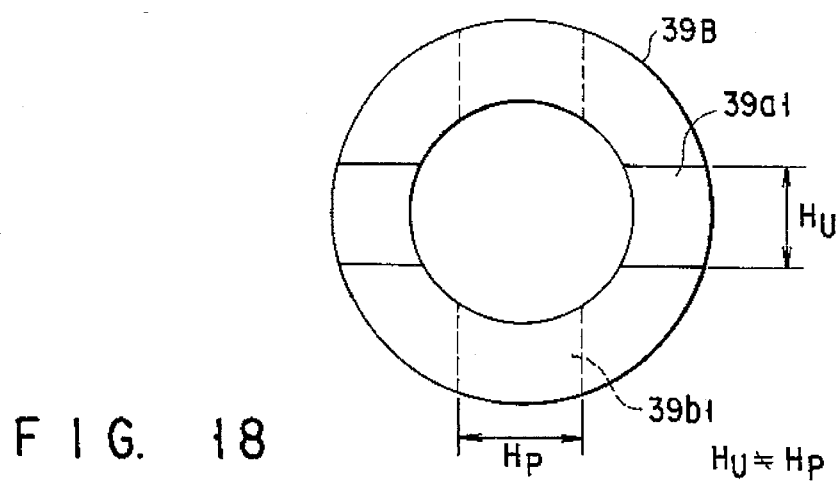
FIG. 18 is a front view of a first modification of the Oldam ring, which has key grooves having different widths.

FIG. 18 is a front view of a first modification of the oldham ring 38B. The first modified oldham ring 38B has key grooves 39a1 and key grooves 39b1. The key grooves 39a1 have a width $H_U$ which differs from the width $H_P$ of the key grooves 39b1. More precisely, the width $H_U$ is less than the width $H_P$.

Needless to say, the modified oldham ring 38B is made of silicon nitride ceramic. The piston 27 and the second cylinder bearing 33 are made of different metallic materials. To be more specific, the piston 27, which has the oldham portion 27c fit in the key grooves 39a having a small width $H_U$, is made of a relatively hard metallic material, while the bearing 33, which has projections 37 fitted in the key grooves 39b having a relatively large width $H_P$, is made of relatively soft metallic material. Due to these design measures taken, the oldham ring 38 has sufficient mechanical strength.

Figures 19A, 19B:
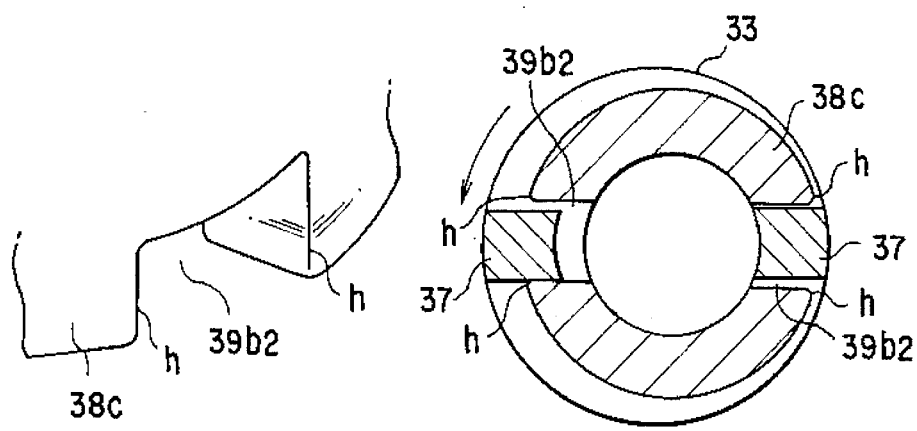
FIG. 19A is a perspective view showing a part of a second modified oldham ring which has rounded edge.
FIG. 19B is a diagram explaining how the second modified oldham ring operates.

FIGS. 19A and 19B show a second modified Oldam ring 38C which has a pair of key grooves 39b2. Each key groove 39b2 and the outer circumferential surface of the ring 38C define two edges h. The edges h are rounded, some clearance (a gap) is provided between the walls of the key groove 39b2 and the projection 37 fitted in the key groove 39b2. Hence, the edges h slide on the sides of the projections 37, not abutting thereon, during the operation of the oldham mechanism 40 (FIG. 16). The Oldam ring 38C is prevented from being worn, particularly at the edges h, despite it is made of silicon nitride ceramic and the projections 37 made of metal is fitted in the grooves 39b2.

The second modified oldham ring 38C has another pair of key grooves (not shown). The edges defined by the other key grooves and the outer circumferential surface of the ring 38C may also be rounded. In this case, the oldham ring 38C is prevented from being worn, particularly at these edges h.

FIG. 20A illustrates a third modified oldham ring 38D having a thickness T. This oldham ring 38D is characterized in that the depth T1 of the key grooves 39a3 and the depth T2 of the key grooves 39b3 exceed 0.5T. The wall of one key groove 39a3 and the wall of the nearest key groove 39b3 oppose each other at the parts shaded in FIG. 20A. The bending moments applied on these wall parts of the key grooves 39a3 and 39b3 during the operation of the oldham mechanism 40 (FIG. 16) cancel out each other. As a result, the total bending moment M exerted on the oldham ring 38D is less than otherwise.

FIG. 20B shows an oldham ring O which falls outside the scope of the present invention. The oldham ring O has a pair of key grooves m and a pair of key grooves n. The key grooves m and n have depths which are less than half the thickness T of the oldham ring O. Obviously, the wall of one key groove m and the wall of the nearest key groove n have no parts which oppose each other. The bending moments applied on these walls of the key grooves m and n during the operation of the oldham mechanism cannot cancel out each other. The total bending moment M exerted on the oldham ring O is inevitably large, fatiguing the oldham ring O and, possibly, causing rupture of the oldham ring O.

The oldham ring for use in the present invention may have one flat reference surface or two flat and parallel reference surfaces, formed by machining a circumferential portion or portions of the ring.

FIG. 21 shows a fourth modified oldham ring 38E which has two reference surfaces S. The reference surfaces S are used as reference planes in precisely machining the ring to form key grooves 39a and 39b. To be more specific, the grooves 39a are gradually cut in the surfaces S along a line extending at right angles thereto, and the grooves 39b are gradually cut in the curved surfaces along a line extending parallel to the reference surfaces S. The reference surfaces S help to enhance the precision and speed of machining the oldham ring.

As has been described, the fluid compressor according to the second embodiment of the invention has the oldham mechanism illustrated in FIG. 16 which transmits a rotational force from the cylinder to the piston. The oldham ring used in the oldham mechanism, the cylinder and the piston have such a specific positional relation, and the distance by which the cylinder and the piston are eccentric to each other is of such a value, that the oldham ring does not contact the cylinder or the piston. Therefore, the vibration of the fluid compressor and the noise the compressor makes can be suppressed.

Since the second cylinder bearing made of metal functions as an oldham-ring receiver and makes it unnecessary to use an oldham-ring receiver, the fluid compressor comprises less components than otherwise and can, therefore, be manufactured at a low cost.

Furthermore, since the outer diameter of the oldham ring, the inner diameter thereof, and the distance by which the cylinder and the piston are eccentric have a particular relationship, stress is less concentrated than otherwise at the corners of the grooved portions of the oldham ring.

In addition, since the oldham ring is made of silicon nitride ceramic whose specific gravity is half or less that of iron-based material, it can rotate readily and has high impact resistance.

The first modified oldham ring (FIG. 18) for use in the second embodiment is characterized in that the key grooves formed in one end surface of the first modified oldham ring have a width different from that of the key grooves formed in the other end surface. Therefore, the first modified oldham ring has sufficient strength though it is made of a material different from that of the cylinder. The first modified oldham ring enhances the reliability of the fluid compressor.

As indicated above, the second modified oldham ring (FIGS. 19A and 19B) has two pairs of key grooves, the first pair in one end surface and the second pair in the other end surface. The edges defined by at least one pair of key grooves and the outer circumferential surface of the oldham ring are rounded. The rounded edges slide on the sides of the projection of the second cylinder bearing or on the flat surfaces of the oldham portion of the piston during the operation of the oldham mechanism. The second modified oldham ring is therefore prevented from being worn, despite it is made of silicon nitride ceramic while the second cylinder bearing and the piston are made of metal.

The third modified oldham ring (FIG. 20A) for use in the second embodiment is characterized in that the key grooves of both pairs have depths exceeding half the thickness of the oldham ring. The wall of one key groove and that of the nearest key groove oppose each other at a part, and the bending moments applied on the opposing wall parts of the key grooves during the operation of the oldham mechanism cancel out each other. As a result, the total bending moment exerted on the third modified oldham ring is less than otherwise.

The fourth modified oldham ring (FIG. 21) has two reference surfaces, which are used as reference planes in precisely machining the ring to form two pairs of key grooves in the end surfaces. That is, the grooves of the first pair are gradually cut in the reference surfaces along a line extending at right angles thereto, whereas the grooves of the second pair are gradually cut in the curved surfaces along a line extending parallel to the reference surfaces.

The oldham rings for use in the fluid compressors according to the first and second embodiments of the invention have two pairs of key grooves. Nonetheless, in the present invention, an oldham ring has a pair of projections protruding from one end surface and another pair of projections protruding from the other end surface. In the case where this oldham ring is used, grooves are formed in the oldham portion of the piston and in the second cylinder bearing, and the oldham ring is positioned with the projections fitted in these grooves.

The fluid compressor according to the present invention is not limited to one for use in a refrigerating cycle. Rather, it can be used in any other apparatuses in which a fluid needs to be compressed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fluid compressor comprising:

rotary drive means;

a cylinder coupled to said rotary drive means and having two ends and an inner circumferential surface;

two bearings supporting the ends of said cylinder;

a piston inserted in said cylinder set in rolling contact with the inner circumference of said surface of said cylinder, located eccentric to said cylinder and having an outer circumferential surface, two ends, and having a helical groove formed in the outer circumferential surface and having a pitch gradually decreasing toward one end of the piston;

a helical blade tightly fitted in said cylinder and loosely fitted in said helical groove such that a portion of each turn of the helical blade protrudes from said helical groove while a diametrically opposite portion of the turn retracts into said helical groove;

a plurality of helical compression chambers defined by said helical blade, the inner circumferential surface of said cylinder and the outer circumferential surface of said piston, each having a cross section gradually decreasing toward said one end of said piston, and designed to compress a gas as the gas is forced toward said end of said piston; and a transmitting mechanism connecting said cylinder and said piston, for transmitting a rotational force from said cylinder to said piston, thereby to rotate said piston, said transmitting mechanism being an Oldham mechanism which comprises:

a key section integral with said piston;

an Oldham ring made of silicon nitride ceramic and having a first group of key grooves in which said key section is slidably fitted, and a second group of key grooves which extend at right angles to the key grooves of the first group; and an Oldham ring receiver having a key section slidably fitted in the grooves of the second group and coupled to said Oldham ring, wherein the key grooves of the first and second groups have such depths that the walls of the key grooves oppose in part.

2. The fluid compressor according to claim 1, wherein said oldham ring receiver is a bearing made of metal, mounted on one of said bearings, and secured to the inner circumferential surface of said cylinder.

3. The fluid compressor according to claim 1, wherein those portions of said oldham ring which have the key grooves of the first and second groups have a thickness ranging from 2 mm to 5 mm.

4. The fluid compressor according to claim 1, wherein corners of the key grooves of the first and second groups are rounded and have a radius of curvature of at least 0.2, and at most 2 to 5 mm which is the thickness of those portions of said oldham ring which have the key grooves of the first and second groups.

5. The fluid compressor according to claim 1, wherein the key section integral with said piston and the key section of said oldham ring receiver have at root a groove which has a width 0.1 to 2.0 times the thickness of those portions of said oldham ring which have the key grooves of the first and second groups.

6. The fluid compressor according to claim 1, wherein a sum of the gap between the key section integral with said piston and the key grooves of the first group and the gap between the key section of said oldham ring receiver and the key grooves of the second group is 500 µm or less.

7. The fluid compressor according to claim 1, wherein the key groups of the first group and the key grooves of the second group have slanted edge portions, each having a height 0.1 to 2.0 times the thickness of those portions of said oldham ring which have the key grooves of the first and second groups.

8. A fluid compressor comprising:

rotary drive means;

a cylinder coupled to said rotary drive means and having two ends and an inner circumferential surface;

two bearings supporting the ends of said cylinder;

a piston inserted in said cylinder, set in rolling contract with the inner circumferential surface of said cylinder, located eccentric to said cylinder and having a shaft portion, an outer circumferential surface, two ends, and a helical groove formed in the outer circumferential surface and having a pitch gradually deceasing toward one end of the piston;

a helical blade tightly fitted in said cylinder and loosely fitted in said helical groove such that a portion of each turn of the helical blade protrudes from said helical groove while a diametrically opposite portion of the turn retracts into said helical groove;

a plurality of helical compression chambers defined by said helical blade, the inner circumferential surface of said cylinder and the outer circumferential surface of said piston, each having a cross section gradually decreasing toward said one end of said piston, and designed to compress a gas as the gas is forced toward said end of said piston; and a transmitting mechanism connecting said cylinder and said piston, for transmitting a rotational force from said cylinder to said piston, thereby to rotate said piston, said transmitting mechanism being an Oldham mechanism which comprises:

a key section integral with said piston;

an Oldham ring having a first group of key grooves in which said key section is slidably fitted, and a second group of key grooves which extend at right angles to the key grooves of the first group; and an Oldham ring receiver having a key section slidably fitted in the grooves of the second group and coupled to said Oldham ring, said cylinder, the shaft portion of said piston and said Oldham ring having such sizes, and said cylinder and said piston are so positioned that the following relationships are satisfied:

$D0 < (Dc - 2e)$ $d0 > (dp + 2e)$ where Dc is the inner diameter of said cylinder, dp is the diameter of said shaft portion, D0 is the outer diameter of said Oldham ring, d0 is the inner diameter of the Oldham ring, and e is the distance by which said piston is eccentric to said cylinder, wherein said Oldam ring is made of silicon nitride ceramic having a specific gravity which is half or less the specific gravity of iron-based material and wherein the key grooves of the first and second groups have such depths that the walls of the key grooves oppose in part.

9. The fluid compressor according to claim 8, wherein said oldham ring receiver is a bearing made of metal, mounted on one of said bearings, and secured to the inner circumferential surface of said cylinder.

10. The fluid compressor according to claim 8, wherein the outer diameter D0 and inner diameter d0 of said oldham ring and the distance e by which said piston is eccentric to said cylinder have the following relationship:

$(D0 - d0) > 2e.$

11. The fluid compressor according to claim 8, wherein the key grooves of said first group have a width different from the width of the key groove of said second group.

12. The fluid compressor according to claim 8, wherein the key grooves of the first and second groups have edges, and at least those edges of the key grooves which are set in sliding contact with said key portion are rounded.

13. The fluid compressor according to claim 8, wherein said oldham ring has at least a flat reference surface formed by machining a circumferential portion of said oldham ring, the key grooves of the first group have been gradually cut along a line extending at right angles to said at least one reference surface, and the key grooves of said second group have been gradually cut along a line extending parallel to said at least one reference surfaces.

* * * * *